June 30, 1959     J. J. BEOLETTO     2,892,482

VEHICLE SEAT MOUNTING UNITS

Filed May 21, 1956     2 Sheets-Sheet 1

Joseph J. Beoletto
INVENTOR.

BY *Clarence A. O'Brien*
*and Harvey B. Jacobson*
Attorneys

June 30, 1959  J. J. BEOLETTO  2,892,482
VEHICLE SEAT MOUNTING UNITS
Filed May 21, 1956                                          2 Sheets-Sheet 2
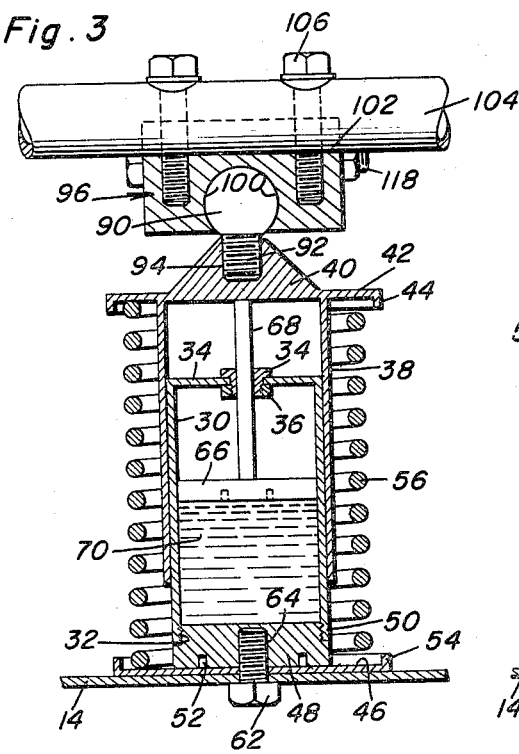
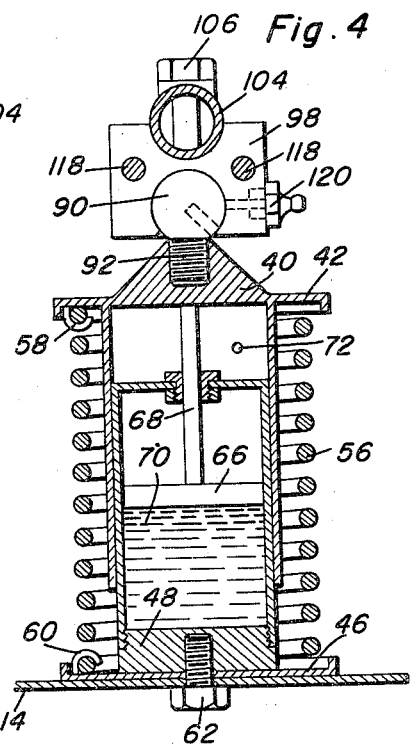
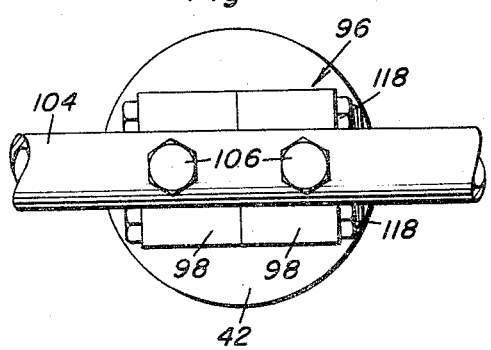
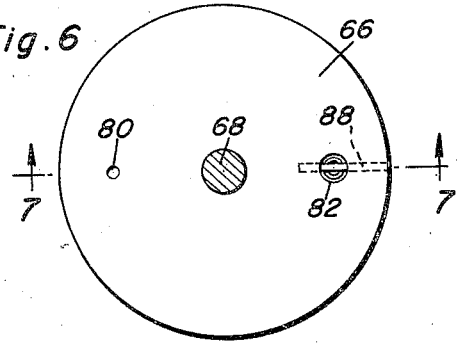
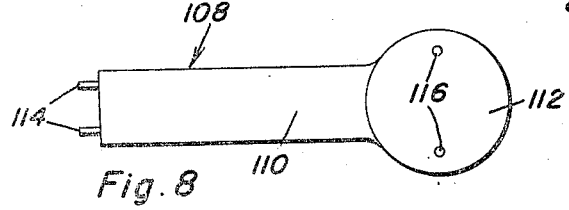
Joseph J. Beoletto
INVENTOR.

United States Patent Office 2,892,482
Patented June 30, 1959

2,892,482

VEHICLE SEAT MOUNTING UNITS

Joseph J. Beoletto, Secor, Ill.

Application May 21, 1956, Serial No. 586,170

7 Claims. (Cl. 155—9)

This invention comprises novel and useful vehicle seat mounting units and more particularly pertains to a resilient support for yieldingly supporting the seats of tractors, trucks and other vehicles.

The principal purpose of this invention is to provide a resilient mounting or support for the seats of vehicles whereby a more resilient and comfortable seat mounting may be obtained for cushioning the jars and shocks normally associated with seats of heavy duty vehicles such as trucks, tractors and the like.

A further object of the invention is to provide a resilient seat support in conformity with the preceding object wherein the resiliency of movement of the support may be effectively damped or checked by the incorporation of a dashpot construction therein.

A further object of the invention is to provide a seat support in conformity with the preceding objects wherein an improved swivel connecting means is provided for securing the frame member of a seat to the resilient support, thereby securing a resilient cushioning of the seat while permitting relative tilting or swiveling of the seat with respect to the support in order to equalize the supporting of the seat.

A still further important object of the invention is to provide a greatly improved resilient support for seats which will provide an extremely compact unit and one having a relatively low over-all height, and yet will permit the resilient mounting of a seat and the use of a dashpot for snubbing or damping the resilient operation of the device.

Yet another object of the invention is to provide a resilient mounting or support for seats in conformity with the above mentioned objects wherein the various elements making up the device may be readily disassembled.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a view in vertical section through the device of Figure 1 and showing the details of its internal construction;

Figure 4 is a view similar to Figure 3 but taken at right angles thereto;

Figure 5 is a top plan view of Figure 3 and showing the manner in which a seat frame member is secured to the resilient support;

Figure 6 is a horizontal sectional view of the plunger and plunger rod of the dashpot element of the invention;

Figure 7 is a vertical sectional view, taken substantially upon the plane indicated by section line 7—7 of Figure 6; and, Figure 8 is a plan view of a suitable form of tool which may be employed for assembling and disassembling various elements of this invention.

The resilient seat support of this invention is generally applicable to seats of vehicles such as trucks, tractors and the like, and which are of a type that are normally subjected to considerable jolting and jarring of the seat and its occupant during the operation of the vehicle. The intent of this invention is to provide an improved form of novel resilient seat support which will greatly soften or cushion the jars and shocks imparted to the seat during the use of such vehicles.

Figure 1:
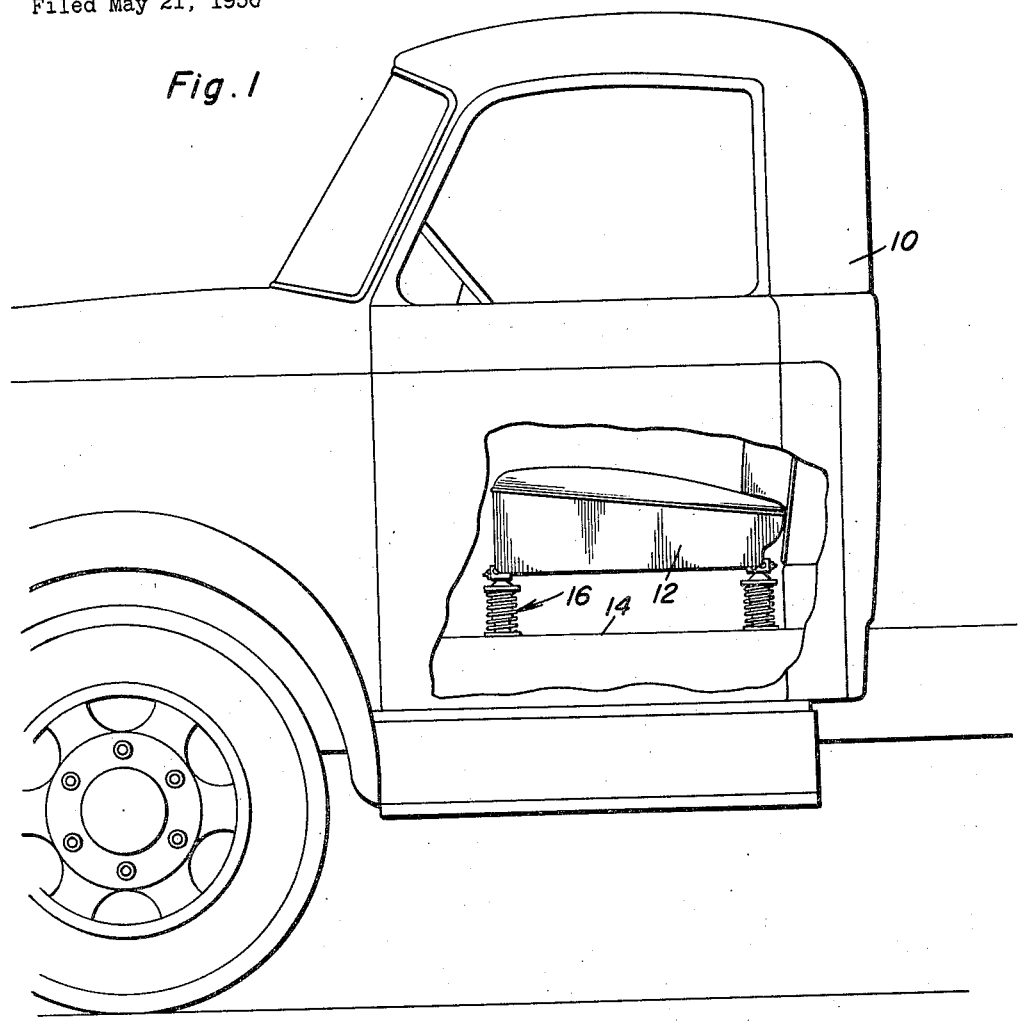
Figure 1 is a side elevational view, parts being broken away, and showing a preferred embodiment of resilient seat support in accordance with this invention applied to the seat of a truck.

Indicated in Figure 1 by the numeral 10 is a portion of a truck or other vehicle such as the cab of the same, and in which is provided a seat 12 suitably secured upon a floor panel 14, by means of the resilient supports 16 forming the subject of this invention.

Figure 2:
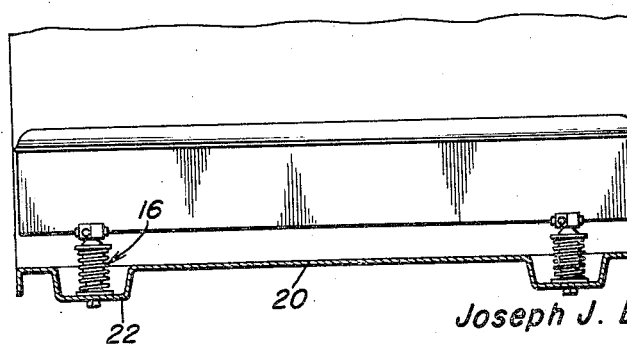
Figure 2 is a view in vertical section, similar to the arrangement of Figure 1, but showing a slightly modified mounting of the device for obtaining a lower elevation of the seat.

As will be observed from Figures 3 and 4, the supports 16 are flat panels, while in the modified construction of Figure 2, the support 20 is provided with suitable depressions or wells 22 for the reception of the resilient supports 16 to thereby, in this instance, considerably lower the clearance between the seat and the floor panel.

Referring now especially to Figures 3 and 4 it will be seen that the resilient mounting or support comprises a stationary cylinder 30 which is open at its lower end, being provided with internal threads 32 and is provided with a closed top wall 34 through which extends an axially disposed packing means or packing gland 34, retained as by a fastening nut 36. A sleeve 38 is slidingly and telescopingly received over the upper portion of the stationary cylinder 30, this sleeve being open at its lower end and its upper end being provided with a top wall 40 having an annular laterally outwardly extending flange 42 with a downturned rim 44 thereon.

A combined closure and mounting means for the cylinder and a means for securing the same to the bottom panel or supporting surface 14 or 20 is provided. This means consists of a plate 46 having a cylindrical plug 48, which plug is received within the open lower end of the cylinder 30 and is provided with external threads 50 for engagement with the threads 32. The plug thus provides both a closure for the cylinder and a support for the same.

The bottom surface of the plug is preferably provided with a pair of recesses or bores 52 to receive a suitable tool by means of which the plug may be screwed into or removed from the open lower end of the cylinder.

The flange 46 is substantially the same diameter as the flange 42, and also is provided with an upturned rim 54 which is complementary to the rim 44.

A spring means in the form of a compression spring 56 is operatively interposed between the two flanges 42 and 46, and may be anchored thereto as by deformable lug portions 58 and 60, respectively, see Fig. 4, this spring yieldingly urging the sleeve and cylinder in extended position relative to each other. The sleeve and cylinder together with the spring thus constitute a resilient cushioning support for the seat 12 in a manner to be subsequently set forth.

The flange 46 also serves as a means for mounting the cylinder upon the supporting surface of the member 14. For this purpose there is provided a centrally disposed bolt 62 which may extend upwardly through the floor 14, through the flange 46 and into an internally threaded bore 64 in the plug member 48. Thus, the device may be removably secured to the supporting surface 14, or in the well portion 22 of the supporting surface 20 in the modified arrangement of Figure 2.

A dashpot is provided upwardly connecting the sleeve 38 with the stationary cylinder 30. For this purpose there is provided a plunger 66 slidable within the cylinder, and having a rod 68 extending through the packing means 34 and rigidly secured in any desired fashion to the underside of the top wall 40. A suitable shock absorbing fluid 70 is disposed within the cylinder 30 beneath the plunger 66, and opposes downward movement of the plunger within that cylinder. As shown in Figure 4, a vent 72 in the upper portion of the sleeve 38 permits the ingress or egress of air therefrom, whereby the dashpot plunger 66 constitutes the sole damping means for the action of the spring 56.

Referring now particularly to Figure 7 it will be seen that the plunger 66 is provided with an internally threaded axial bore 74 for receiving the externally threaded extremity 76 of the rod 68. In addition, the bottom surface of the plunger is provided with a pair of bores or recesses 78 providing means whereby the plunger may be applied or removed from the rod 68 as set forth hereinafter.

A pair of passages 80 and 82 extend through the plunger and provide a communication between the top and bottom surfaces of the same. Each of these passages is provided with reversely directed one way, non-return ball check valve 84 which is yieldingly urged as by a spring 86 to closed position, each spring being retained and seating upon a transversely inserted pin 88. It will thus be seen that fluid 70 may pass from one side of the plunger to the other side under control of one of the passages 80 or 82 and its non-return check valve. The diameter of the smallest portion of the passage thus constitutes a throttling effect upon flow of the fluid which provides a dashpot effect upon the relative reciprocation of the sleeve 38 and the cylinder 30.

A swivel connecting means is provided for operatively connecting the seat 12 to the resilient support member. Thus there is provided a ball 90 having an externally threaded stem 92 received in the internally threaded bore 94 formed by the central boss of the top wall 40 of the sleeve. Cooperating with this ball is a socketed block 96. As shown more clearly in Figures 3 and 5, this block comprises a pair of sections each indicated by the numeral 98, and which sections have complementary engaging vertical surfaces, each of which is provided with a recess 100, these two recesses being complementary and constituting a socket swivelly receiving the ball 90 therein.

Disposed in the top surface of the sections 98 of the block is a channel or recess 102 in which is disposed the rod-like or tubular frame element 104 constituting a seat frame member of the seat 12. A pair of bolts 106 comprise a securing or fastening means which extends through the frame member 104 and secures the same to each of the sections 98.

It will thus be apparent that the seat is securely attached to the blocks 96 constituting the swivel connecting means, and thus is positively secured to the resilient or cushioning supports or mounting units of this invention.

Shown in Figure 8 is a form of tool particularly adapted to assist in the assembling or disassembly of the components of this unit. The tool, indicated generally by the numeral 108, comprises a shank portion 110 and an enlarged cylindrical head portion 112. Projecting from the shank 110 opposite the head are a pair of parallel pins 114, and projecting from the head 112 are a second pair of pins 116. The pins 116 are adapted to engage in the recesses 52 in order to remove the plug 48 from the interior of the cylinder 30 while the pins 114 are adapted to engage in the recesses 78 whereby to remove the plunger from its rod 68.

Referring again to Figures 3, 4 and 5, it will be seen that a pair of bolts 118 extend longitudinally through the two block sections 98 for securing the same rigidly together upon the ball 90. Further, a conventional type of lubricating fitting 120 is provided in order to admit lubricant into the ball and socket connection between the ball 90 and the recesses 100.

It will thus be apparent that there has been provided a resilient cushioning support for seats which permits relative swiveling movement of the seat with respect to the support unit, provides a lubricating means for the swiveling connection, and is readily detachably connected to a seat frame member and to the resilient support. The latter provides a dashpot which dampens or limits the freedom of the resilient action of the device. Further, the device is adapted for either seats having a normal or those having a relatively low clearance with the floor of the vehicle to which the seats are mounted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A resilient seat support comprising a stationary cylinder having its axis vertical and with an integral closed upper end and an open lower end, a closure plug received in said lower end, means securing said plug upon a supporting surface whereby said plug constitutes the mounting means for said cylinder, a piston slidable in said cylinder and having an integral upwardly projecting piston rod slidably extending through said upper end, valved passage means in said piston providing for retarded flow of fluid therethrough whereby said piston constitutes a dash pot, a sleeve open at its lower end and closed at its upper end and embracing the upper portion of said cylinder for guided sliding movement thereon, a swivel connecting means carried by and rising above said sleeve closed upper end for securing a seat frame member to said sleeve, said piston rod being connected to the underside of said sleeve upper end, a compression spring surrounding said sleeve and cylinder and having its opposite ends attached to the lower end of the cylinder and the upper end of said sleeve.

2. The combination of claim 1 wherein said swivel connecting means comprises a ball carried by said sleeve, a block having a socket receiving said ball, a channel in said block for receiving therein a seat frame member.

3. The combination of claim 1 wherein said swivel connecting means comprises a ball carried by said sleeve, a block having a socket receiving said ball, a channel in said block for receiving therein a seat frame member, said block comprising a pair of sections having vertical complementary surfaces, said socket comprising registering complemental recesses in said surfaces, means securing said sections together.

4. The combination of claim 1 wherein said swivel connecting means comprises a ball carried by said sleeve, a block having a socket receiving said ball, a channel in said block for receiving therein a seat frame member, said block comprising a pair of sections having vertical complementary surfaces, said socket comprising registering complemental recesses in said surfaces, means securing said sections together, fasteners for securing said seat frame member to each of said sections.

5. The combination of claim 1 including a disk having an upstanding flange about its periphery, said disk being disposed between said plug and said supporting surface and being secured to said plug by said securing means, said spring engaging said disk within said flange.

6. The combination of claim 5 wherein said sleeve has an integral lateral annular flange, said spring means engaging the latter.

7. The combination of claim 1 including a fixed vent in said sleeve above the closed upper end of said cylinder for relieving pressure within said sleeve between the closed upper ends of said sleeve and cylinder.

References Cited in the file of this patent

UNITED STATES PATENTS

| | | |
|---|---|---|
| Re. 16,582 | Morinelli | Apr. 5, 1927 |
| 1,423,904 | Blyburg | July 25, 1922 |
| 2,059,848 | Cavitt | Nov. 3, 1936 |
| 2,183,003 | Becker | Dec. 12, 1939 |
| 2,201,280 | Yantes | May 21, 1940 |
| 2,397,322 | McArthur | Mar. 26, 1946 |
| 2,529,639 | Sterzer | Nov. 14, 1950 |
| 2,531,572 | Knoedler | Nov. 28, 1950 |
| 2,534,047 | McIntyre | Dec. 12, 1950 |
| 2,601,886 | Randolph | July 1, 1952 |
| 2,680,472 | Hempe | June 8, 1954 |